(12) United States Patent
Hurst

(10) Patent No.: US 11,822,357 B2
(45) Date of Patent: Nov. 21, 2023

(54) PILOT-CONTROLLED COOLANT VALVE

(71) Applicant: Schaeffler Technologies AG & Co. KG, Herzogenaurach (DE)

(72) Inventor: Sebastian Hurst, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 116 days.

(21) Appl. No.: 17/436,360

(22) PCT Filed: Mar. 12, 2020

(86) PCT No.: PCT/DE2020/100180
§ 371 (c)(1),
(2) Date: Sep. 3, 2021

(87) PCT Pub. No.: WO2020/182257
PCT Pub. Date: Sep. 17, 2020

(65) Prior Publication Data
US 2022/0163981 A1 May 26, 2022

(30) Foreign Application Priority Data

Mar. 14, 2019 (DE) .................... 10 2019 106 498.8

(51) Int. Cl.
*F16K 31/40* (2006.01)
*G05D 7/00* (2006.01)
(Continued)

(52) U.S. Cl.
CPC ......... *G05D 7/005* (2013.01); *F16K 31/0655* (2013.01); *F16K 31/363* (2013.01); *F16K 31/406* (2013.01)

(58) Field of Classification Search
CPC ..... Y10T 137/87917; Y10T 137/88054; Y10T 137/87981; Y10T 137/88046;
(Continued)

(56) References Cited

U.S. PATENT DOCUMENTS 338,771 A * 3/1886 Soden .................. F16K 31/363
236/80 R
3,818,927 A * 6/1974 Zeuner ................ F16K 31/0655
251/129.02
(Continued)

FOREIGN PATENT DOCUMENTS

CN 101270825 A 9/2008
CN 108713118 A 10/2018
(Continued)

*Primary Examiner* — Matthew W Jellett

(57) ABSTRACT

A pilot-controlled coolant valve is provided that includes a pressure chamber, a pressure release chamber, a control opening, a pressure release channel, an actuator having a plunger, a control piston stroke-actuated by the plunger, a closing piston moving in the pressure chamber, and a valve seat. The pressure chamber has an in-flow and an out-flow for coolant. The control opening connects the pressure release chamber to the pressure chamber. The control piston closes the control opening during the stroke actuation by the plunger, except for a radial sealing gap between the control piston and the control opening. When the control opening is closed, the closing piston sealingly rests on the valve seat and interrupts the connection of the through-flow chamber with the in-flow. Axial end sides of the closing piston delimit a stagnation pressure chamber on one side and a through-flow chamber on the other side.

18 Claims, 2 Drawing Sheets

(51) Int. Cl.
*F16K 31/06* (2006.01)
*F16K 31/363* (2006.01)

(58) Field of Classification Search
CPC ..... Y10T 137/88005; Y10T 137/88038; Y10T 137/88022; Y10T 137/87997; F16K 31/363; F16K 31/406; F16K 31/408; G05D 7/005; F01P 7/16; F01P 2007/146
USPC .......... 251/14, 30.01, 30.02, 129.02
See application file for complete search history.

(56) References Cited

U.S. PATENT DOCUMENTS

| | | | | |
|---|---|---|---|---|
| 5,803,556 | A * | 9/1998 | Weis | B60T 8/3675 |
| | | | | 303/119.2 |
| 6,152,088 | A | 11/2000 | Occella et al. | |
| 6,152,420 | A * | 11/2000 | Hohl | B60T 8/363 |
| | | | | 303/119.2 |
| 7,028,713 | B2 * | 4/2006 | Koyama | F16K 31/406 |
| | | | | 137/881 |
| 2014/0264101 | A1 * | 9/2014 | Perotto | F01P 3/06 |
| | | | | 251/28 |
| 2016/0169407 | A1 | 6/2016 | Aguilar et al. | |
| 2017/0284277 | A1 | 10/2017 | Wardle et al. | |

FOREIGN PATENT DOCUMENTS

| | | |
|---|---|---|
| DE | 102004014068 A1 | 10/2004 |
| DE | 112013004902 T5 | 6/2015 |
| DE | 102017122271 A1 | 3/2019 |
| EP | 2778364 B1 | 10/2015 |
| EP | 3273124 A1 | 1/2018 |
| EP | 2853795 B1 | 12/2018 |

* cited by examiner

PILOT-CONTROLLED COOLANT VALVE

CROSS-REFERENCE TO RELATED APPLICATIONS

This application is the U.S. National Phase of PCT Application No. PCT/DE2020/100180 filed on Mar. 12, 2020, which claims priority to DE 10 2019 106 498.8 filed on Mar. 14, 2019, the entire disclosure of which is incorporated by reference herein.

TECHNICAL FIELD

This disclosure relates to a pilot-controlled valve which controls the flow of coolant through an engine block of an internal combustion engine.

BACKGROUND

Such a coolant valve is known from an unpublished application having the file number DE 10 2017 122 271.5. When the control opening is closed, the permanent connection between the stagnation pressure chamber and the in-flow causes the closing piston to pause in the closed position, i.e. in sealing contact with the valve seat, only due to the pressure of the coolant. The closing movement of the closing piston from the open to the closed valve position is generated by the difference in static pressures which act on the respective axial end side of the closing piston on the part of the stagnation pressure chamber and—to a lesser extent due to the flow—on the part of the through-flow chamber.

The amount of this pressure difference decreases as the volumetric flow over the through-flow chamber decreases to the extent that the hydrodynamically constrained compressive forces acting on the closing piston within the working range of smaller volumetric flows are no longer sufficient to close the coolant valve or close it sufficiently fast enough. This is particularly true in the case in which the closing piston is loaded in the opening direction with the force of a return spring.

Further pilot-controlled valves are known from US 2017/0284277, EP 2 778 364 B1, DE 11 2013 004 902 T5, and DE 10 2004 014 068 A1.

U.S. Pat. No. 6,152,088 A discloses a cooling system of an internal combustion engine.

SUMMARY

The object of the present disclosure is to improve a pilot-controlled coolant valve of the aforementioned type in terms of design such that the coolant valve closes sufficiently quickly enough even when there are small volumetric flows and accordingly small differential pressures at the closing piston.

The object is achieved by means of the features described herein. Accordingly, the coolant valve can comprise the following:
  a pressure chamber having an in-flow and an out-flow for the coolant,
  a pressure release chamber,
  a control opening which connects the pressure release chamber to the pressure chamber,
  a pressure release channel which permanently (or continuously fluidly) connects the pressure release chamber to the out-flow,
  an actuator having a plunger,
  a control piston stroke-actuated by the plunger in the direction of the in-flow, which control piston closes the control opening during the stroke actuation by the plunger, except for a radial sealing gap between the outer casing surface of the control piston and the inner casing surface of the control opening,
  a closing piston moving in the pressure chamber, the axial end sides of which delimit a stagnation pressure chamber on one side, into which the control opening feeds, and which delimit a through-flow chamber on the other side, into which the in-flow feeds, wherein a pressure channel passing through the closing piston permanently (or continuously fluidly) connects the stagnation pressure chamber to the in-flow,
  and a valve seat which limits the feed-in of the in-flow in the through-flow chamber, wherein the control piston stroke-actuates the closing piston in the direction of the valve seat, and wherein, when the control opening is closed, the closing piston rests on the valve seat, in a sealing manner, and interrupts the connection between the though-flow chamber and the in-flow.

Consequently, the coolant valve according to the disclosure differs from the coolant valve mentioned at the outset in that the plunger not only stroke-actuates the control piston but also the closing piston. The equally mechanical actuation of the closing piston by the actuator supplements the pressure difference at the closing piston which is insufficient for closing the valve or the closing rate thereof with small volumetric flows and is enabled in that the closing piston closes the control opening, except for a radial sealing gap between the outer casing surface of the control piston and the inner casing surface of the control opening, and simultaneously or subsequently stroke-actuates the closing piston in the direction of the valve seat.

The mechanical actuation of the closing piston can take place, as a function of the balance of forces and pressures acting on the closing piston:
  either only with small volumetric flows or in the entire characteristic map of the coolant valve as related to the coolant flow, and
  either only partially, i.e. with a limited initial stroke, or completely, i.e., until the closing piston sealingly rests on the valve seat, as related to the actuation stroke.

BRIEF DESCRIPTION OF THE DRAWINGS

Further features of the disclosure result from the following description and the figures, in which an exemplary embodiment of a coolant valve according to the disclosure is shown partially schematically. In the figures.

DETAILED DESCRIPTION

Figure 1:
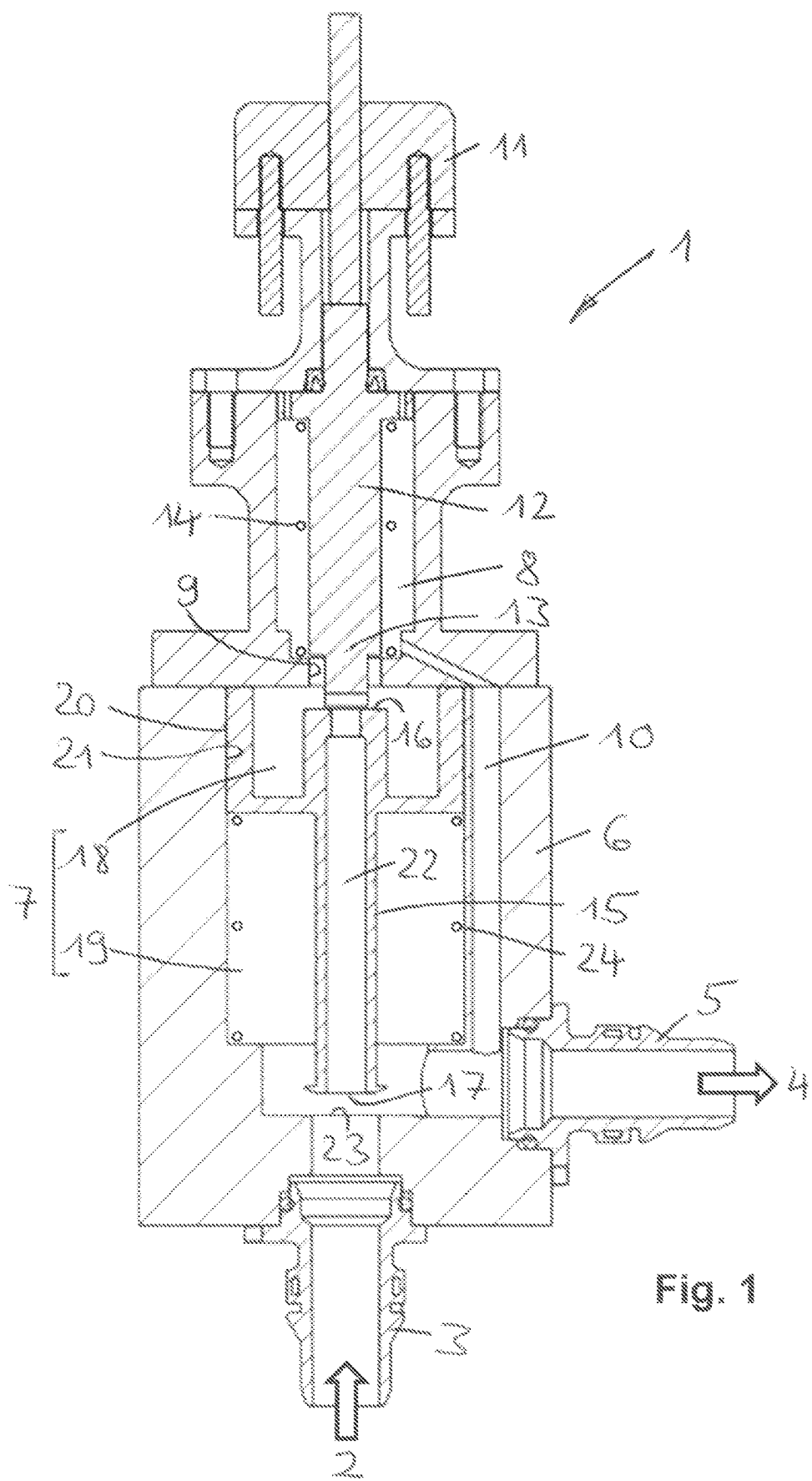
FIG. 1 shows the coolant valve in longitudinal section.

The coolant valve 1 shown in FIG. 1 controls the flow of coolant through the engine block of an internal combustion engine. The coolant valve 1 is pilot-controlled and has an in-flow nozzle 3 forming an in-flow 2 for the coolant and an out-flow nozzle 5 forming the out-flow 4 for the coolant, which are attached to a valve housing 6. The valve housing 6 has a pressure chamber 7, to which the in-flow 2 and the out-flow 4 are connected, and a pressure release chamber 8, as well as a control opening 9, which connects the pressure release chamber 8 to the pressure chamber 7. The pressure release chamber 8 is permanently (or continuously fluidly) connected to the out-flow 4 via a pressure release channel 10.

The pilot control takes place by means of an actuator 11, which is an electrically actuated solenoid and comprises a plunger 12 moving in the pressure release chamber 8, which plunger stroke-actuates a control piston 13 in the direction of the control opening 9 and the in-flow 2. The control piston 13 is formed as a single piece with the plunger 12 and impacted with a spring force of a control spring 14, which spring force is directed opposite the solenoid.

A closing piston 15, arranged coaxially relative to the plunger 12 and the control piston 13, moves in the pressure chamber 7. Axial end side 16 of the closing piston 15 delimits a stagnation pressure chamber 18 on one side, into which the control opening 9 feeds. Axial end side 17 of the closing piston 15 delimits a through-flow chamber 19 on the other side, into which the in-flow 2 feeds. The closing piston 15 is guided in the pressure chamber 7 via a sealing gap between the outer casing surface 20 of the closing piston 15 and the inner casing surface 21 of the pressure chamber 7. A pressure channel 22 passing through the closing piston 15 permanently (or continuously fluidly) connects the stagnation pressure chamber 18 to the in-flow 2, the feed-in of which in the through-flow chamber 19 is delimited by a valve seat 23. The cross-sectional surface delimited by the valve seat 23 is less than the cross-sectional surface of the pressure chamber 7.

In the closed state of the coolant valve 1, the closing piston 15 sealingly rests on the valve seat 23, and interrupts the connection between the through-flow chamber 19 and the in-flow 2. A piston spring 24 impacts the closing piston 15 in the opening direction thereof with a spring force directed away from the in-flow 2.

The function of the coolant valve 1 is explained by means of FIGS. 2a to 2d in the following, each of which shows the section in the region of the control opening 9 relevant for the pilot control of the coolant valve 1. Reference numerals not indicated therein can be found in FIG. 1.

Figure 2A:
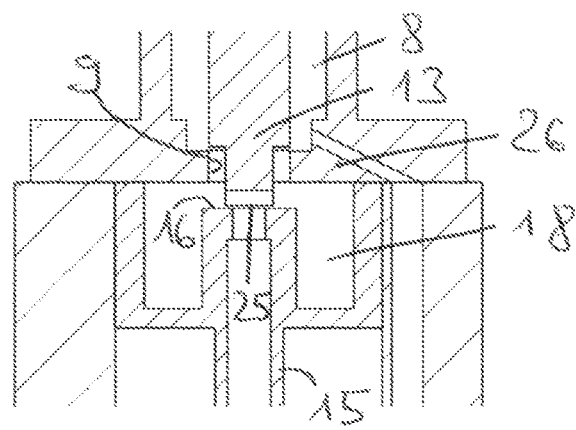
FIGS. 2a-2d show the closing and opening process of the coolant valve in various sequences.

FIG. 2a: The coolant valve 1 is completely open for maximum flow between the in-flow 2 and the out-flow 4. When the actuator 11 is switched off, the control piston 13 is in the retracted position, in which the pressure-relieving connection between the pressure release chamber 8 and the stagnation pressure chamber 18 is produced via the control opening 9. The end side 16 of the closing piston 15 delimiting the stagnation pressure chamber 18 is spaced apart from the actuating end side 25 of the control piston 13 and rests with the guided outer diameter region on the separating wall 26 between the stagnation pressure chamber 18 and the pressure release chamber 8.

Figure 2B:
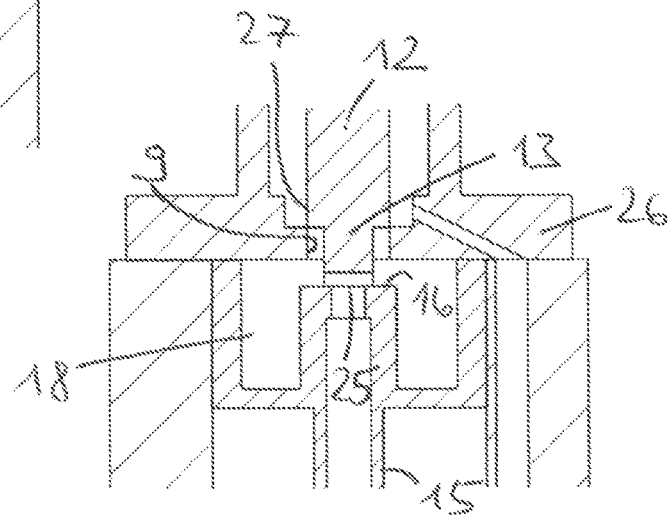

FIG. 2b: The closing process of the coolant valve 1 starts so that the actuator 11 is supplied with electricity and stroke-actuates the plunger 12 with the control piston 13 in the direction of the closing piston 15, opposite the spring force of the control spring 14 (not shown in the section). In this process, end sides 25 and 16 of extended control piston 13 or closing piston 15 make mutual contact with one another without tensile force. This should be understood to mean that transverse and compressive forces, but not tensile forces, can be transmitted between the control piston 13 and the closing piston 15.

In the exemplary embodiment shown, the control opening 9 is being closed by the control piston 13, while the position of the closing piston 15 resting on the separating wall 26 remains unchanged as compared to FIG. 2a. This special case can be modified by means of establishing contact of the closing piston 15 that is earlier or later by comparison as relates to the closing of the control opening 9. The control opening 9 is closed by means of the outer casing surface 27 of the control piston 13, which forms a sealing gap with the inner casing surface 28 of the control opening 9 (see FIG. 2c). Guidance of the control piston 13 in the control opening 9 can be improved as needed by means of guide ribs, not shown, which extend axially, as related to the closing piston 15, next to the sealing outer casing surface 27 on the control piston 13.

When the control opening 9 is closed, the difference in static pressures hydrodynamically constrained by the coolant flow over the through-flow chamber 19 means that end side 16 of the (still) open closing piston 15 delimiting the stagnation pressure chamber 18 is impacted with a higher pressure than end side 17 delimiting the through-flow chamber 19, and consequently the closing piston 15 is impacted with compressive force in the closing direction as related to the valve seat 23. If the coolant flow is insufficient, however, this pressure difference can become too small to extend the closing piston 15 opposite the spring force of the piston spring 24 (not shown in the section), the frictional forces, and also the stagnation pressure forces from the flowing coolant and to move it into sealing contact with the valve seat 23.

Figure 2C:
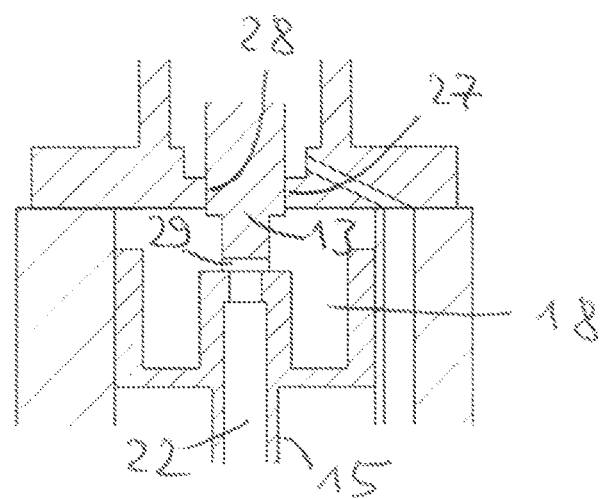

FIG. 2c: The closing force acting on the closing piston 15 results from the hydrodynamically constrained pressure difference and the mechanical force with which the control piston 13, stroke-actuated by the actuator 11, applies to the extended closing piston 15, until it comes into sealing contact with the valve seat 23 and is retained there in its closed position, in which the connection between the through-flow chamber 19 and the in-flow 2 is interrupted. The closing piston 15 is retained in the closed position either only via the compressive force in the stagnation pressure chamber 18 or additionally via the electromagnetic actuation force of the actuator 11. The compressive force in the stagnation pressure chamber 18 corresponds to the coolant pressure in the in-flow 2, which is permanently (or continuously fluidly) connected to the stagnation pressure chamber 18 via the pressure channel 22 and via an end-side bead 29 in the control piston 13.

In the event that the compressive force in the stagnation pressure chamber 18 alone suffices for keeping the closing piston 15 in its closed position, the electromagnetic actuation force acting on the closing piston 15 can be removed by retracting the control piston 13 into a position in which the control opening 9 is closed as before.

Figure 2D:
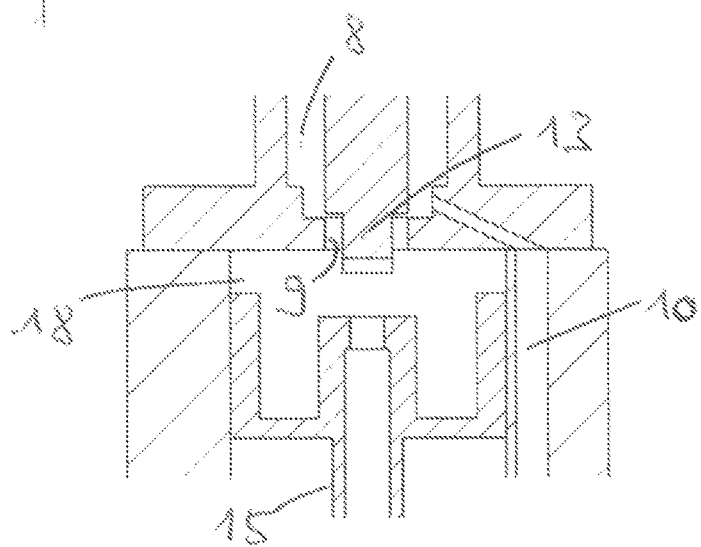

FIG. 2d: The opening process of the coolant valve 1 starts so that the control piston 13 impacted by the pressure in the stagnation pressure chamber 18 and by the spring force of the control spring 14 (not shown in the section) retracts completely. The control opening 9, which is opening during this process, connects the pressure release chamber 8 to the stagnation pressure chamber 18, the pressure of which is released via the pressure release chamber 8 and from there into the out-flow 4 via the pressure release channel 10.

The closing piston 15, impacted by the spring force of the piston spring 24 (not shown in the section) and by the coolant pressure in the in-flow 2, moves back into its open position according to FIG. 2a such that the coolant valve 1 is opened again for maximum flow between the in-flow 2 and the out-flow 4.

The invention claimed is:
1. A pilot-controlled coolant valve comprising:
a pressure chamber having an in-flow and an out-flow, the in-flow configured to direct coolant flow into the pres- sure chamber and the out-flow configured to direct coolant flow out of the pressure chamber,
a pressure release chamber,
a control opening configured to fluidly connect the pressure release chamber to the pressure chamber,
a pressure release channel configured to continuously fluidly connect the pressure release chamber to the out-flow,
an actuator having a plunger,
a control piston configured to be axially displaced by the plunger in a first direction so that the control piston closes the control opening and forms a radial sealing gap between an outer casing surface of the control piston and an inner casing surface of the control opening,
a closing piston configured to move within the pressure chamber, the closing piston having a first axial end side configured to delimit a stagnation pressure chamber, and
a second axial end side configured to delimit a through-flow chamber fluidly connected to the in-flow,
a pressure channel extending through the closing piston, the pressure channel continuously fluidly connecting the stagnation pressure chamber to the in-flow, and
a valve seat configured to receive the second axial end side of the closing piston, and
wherein the control piston is configured to axially displace the closing piston in the first direction, and when the control opening is closed, the closing piston sealingly rests on the valve seat and interrupts the connection between the through-flow chamber and the in-flow.

2. The pilot-controlled coolant valve of claim 1, wherein the control piston and the closing piston have contact without a tensile force transmitted between the control piston and the closing piston.

3. The pilot-controlled coolant valve of claim 1, wherein the control piston is formed as a single piece with the plunger.

4. The pilot-controlled coolant valve of claim 1, wherein the plunger, the control piston, and the closing piston are arranged coaxially.

5. The pilot-controlled coolant valve of claim 1, wherein the actuator is an electrically actuated solenoid.

6. The pilot-controlled coolant valve of claim 1, wherein the control piston and the closing piston are each impacted with a spring force directed in a second direction, opposite the first direction.

7. The pilot-controlled coolant valve of claim 1, further comprising a valve housing, and the pressure chamber, the closing piston, and at least a portion of the pressure release channel are disposed within the valve housing.

8. The pilot-controlled coolant valve of claim 7, wherein the at least a portion of the pressure release channel is arranged radially outwardly of the pressure chamber.

9. The pilot-controlled coolant valve of claim 8, wherein the at least a portion of the pressure release channel extends longitudinally within the valve housing from the out-flow to an axial end of the valve housing.

10. A pilot-controlled coolant valve comprising:
a pressure chamber having:
an in-flow configured to direct coolant flow into the pressure chamber, and
an out-flow configured to direct coolant flow out of the pressure chamber,
a pressure release chamber,
a control opening configured to fluidly connect the pressure release chamber to the pressure chamber,
a pressure release channel configured to continuously fluidly connect the pressure release chamber to the out-flow,
an actuator having a plunger,
a control piston configured to be axially displaced by the plunger in a first direction,
a closing piston disposed within the pressure chamber, the closing piston defining a stagnation pressure chamber and a through-flow chamber within the pressure chamber,
a pressure channel extending through the closing piston, the pressure channel continuously fluidly connecting the stagnation pressure chamber to the in-flow, and
a valve seat configured to receive the closing piston, and
in a first axial position of the control piston:
the pressure release chamber is fluidly connected to the stagnation pressure chamber via the control opening,
in a second axial position of the control piston:
the control opening is closed by the control piston so that a radial sealing gap is formed between an outer casing surface of the control piston and an inner casing surface of the control opening, and
in a third axial position of the control piston:
the closing piston sealingly rests on the valve seat and interrupts a fluid connection between the through-flow chamber and the in-flow, and
the control piston is engaged with the closing piston.

11. The pilot-controlled coolant valve of claim 10, wherein the closing piston maintains one axial position when the control piston is in the first and second axial positions.

12. The pilot-controlled coolant valve of claim 10, wherein in the first and second axial positions of the control piston, the closing piston rests against a separating wall arranged between the stagnation pressure chamber and the pressure release chamber.

13. The pilot-controlled coolant valve of claim 10, wherein in the second axial position of the control piston, the closing piston is separated from the control piston via pressure in the stagnation pressure chamber.

14. The pilot-controlled coolant valve of claim 13, wherein in the second axial position of the control piston, the closing piston sealingly rests on the valve seat.

15. The pilot-controlled coolant valve of claim 10, wherein the control piston is formed as a single piece with the plunger.

16. The pilot-controlled coolant valve of claim 10, wherein the pressure release chamber is arranged radially outwardly of the plunger.

17. The pilot-controlled coolant valve of claim 10, further comprising:
a control spring disposed within the pressure release chamber, and
a piston spring disposed within the through-flow chamber.

18. A method of operating a pilot-controlled coolant valve, the method comprising:
providing a pilot-controlled coolant valve in a switched off state, the switched off pilot-controlled coolant valve having:
a pressure chamber including:
an in-flow configured to direct coolant flow into the pressure chamber, and
an out-flow configured to direct coolant flow out of the pressure chamber,
a pressure release chamber fluidly connected to the out-flow,
an actuator having a plunger, a control piston in a first axial position, the control piston configured to be axially displaced by the plunger, a closing piston disposed within the pressure chamber, the closing piston: i) axially spaced apart from the control piston, and ii) defining a stagnation pressure chamber and a through-flow chamber within the pressure chamber, a control opening fluidly connecting the pressure release chamber to the stagnation pressure chamber, a pressure channel extending through the closing piston, the pressure channel continuously fluidly connecting the stagnation pressure chamber to the in-flow, and a valve seat configured to receive the closing piston, energizing the actuator so that the plunger and control piston move together in an axial direction so that: i) the control piston engages the closing piston, defining a second axial position of the control piston, and ii) a radial sealing gap is formed between the control piston and the control opening, flowing a first volumetric flow of coolant from the in-flow to the stagnation pressure chamber via the pressure channel so that the closing piston axially separates from the control piston in the second axial position and sealingly rests on the valve seat, flowing a second volumetric flow of coolant from the in-flow to the stagnation pressure chamber via the pressure channel such that the closing piston axially moves away from the valve seat, and energizing the actuator so that the plunger and control piston move together in the axial direction so that the closing piston displaces the control piston until the closing piston sealingly rests on the valve seat, defining a third axial position of the control piston.

* * * * *